United States Patent
Sutehall (10) Patent No.: US 7,469,573 B2
(45) Date of Patent: Dec. 30, 2008

(54) METHODS AND APPARATUS FOR DETERMINING THE POSITION OF AN OBSTRUCTION IN A PASSAGE

(75) Inventor: Ralph Sutehall, Gwent (GB)

(73) Assignee: Prysmian Cables & Systems Limited, Hampshire (GB)

( * ) Notice: Subject to any disclaimer, the term of this patent is extended or adjusted under 35 U.S.C. 154(b) by 24 days.

(21) Appl. No.: 11/569,216

(22) PCT Filed: Oct. 12, 2004

(86) PCT No.: PCT/GB2004/004338

§ 371 (c)(1),
(2), (4) Date: Jun. 29, 2007

(87) PCT Pub. No.: WO2005/114103

PCT Pub. Date: Dec. 1, 2005

(65) Prior Publication Data

US 2007/0245807 A1 Oct. 25, 2007

(30) Foreign Application Priority Data

May 21, 2004 (EP) .................................. 04253025

(51) Int. Cl.
*G01M 3/02* (2006.01)
(52) U.S. Cl. ................ 73/37; 73/49.1; 73/37.5
(58) Field of Classification Search .............. 73/37, 73/37.6, 49.5
See application file for complete search history.

(56) References Cited

U.S. PATENT DOCUMENTS

| | | | | |
|---|---|---|---|---|
| 5,645,267 A | * | 7/1997 | Reeve et al. | 254/134.4 |
| 5,732,934 A | * | 3/1998 | Sano et al. | 254/134.4 |
| 6,243,657 B1 | * | 6/2001 | Tuck et al. | 702/150 |
| 6,311,953 B1 | * | 11/2001 | Lang et al. | 254/134.4 |
| 2002/0128783 A1 | * | 9/2002 | Marcu et al. | 702/45 |
| 2002/0131734 A1 | * | 9/2002 | Stark | 385/100 |
| 2003/0056607 A1 | * | 3/2003 | Aronstam | 73/865.8 |
| 2005/0107721 A1 | * | 5/2005 | Whalen et al. | 600/587 |
| 2006/0093442 A1 | * | 5/2006 | Kleineidam et al. | 406/10 |

FOREIGN PATENT DOCUMENTS

| | | |
|---|---|---|
| EP | 0 108 590 | 5/1984 |
| EP | 1480008 | 11/2004 |
| EP | 1598637 | 11/2005 |
| JP | 61025005 | 2/1986 |

* cited by examiner

*Primary Examiner*—Hezron Williams
*Assistant Examiner*—Gunnar J Gissel
(74) *Attorney, Agent, or Firm*—Norris McLaughlin & Marcus (57) ABSTRACT

A method of determining the position of a blockage (192, 392) in a passage (15, 313) having a first end and a second end. The method comprises blowing a sealing device (200) into the passage to form a seal adjacent the blockage (192, 392), then blowing a gas into the passage from the first end, making at least one measurement concerning the gas blown into the passage from the first end and determining a distance D between the first end and the sealing device using the at least one measurement.

22 Claims, 5 Drawing Sheets

METHODS AND APPARATUS FOR DETERMINING THE POSITION OF AN OBSTRUCTION IN A PASSAGE

FIELD OF THE INVENTION

The invention relates to methods and apparatus for determining the position of an obstruction or blockage in a passage defined by ducting or tubing and particularly, but not exclusively, ducting or tubing into which optical fibres are to be installed by blowing.

BACKGROUND TO THE INVENTION

Blown fibre installations may comprise an optical fibre cable containing empty tubes, or ducts, into which optical fibre units are installed by blowing with compressed air. The installation of optical fibres by blowing along passages in a pre-installed cable is known from EP 0 108 590. The cables are often installed a long time before the optical fibre units are blown in and the optical fibre units will often be installed by someone other than the installer of the cable. As a consequence, the person installing the optical fibre unit is quite likely to be unaware of the length of the cable. A further problem is that the cable may be damaged during installation so that one, or more, of the tubes is at least partially blocked, to the extent it is not possible for an optical fibre unit to get past the blockage.

Alternatively, blown fibre installations may comprise pre-installed ducting along which optical fibre cables or optical fibre units can be installed by blowing. Methods for installing optical fibre cables into a pre-installed duct are disclosed in U.S. Pat. No. 5,645,267 and U.S. Pat. No. 6,311,953. The abovementioned problems of knowing the length of the ducting and of damage causing blockages in the ducting may apply equally to this form of blown fibre installation.

The applicant has already addressed the problem of determining the length of pre-installed ducting and of tubes in pre-installed optical fibre cables in European Patent Applications Nos 03 253191.5 and 04 253025.3.

Damage to the ducting or tubes into which the optical fibre units or optical fibre cables are to be installed by blowing gives rise to two problems:

1) the optical fibre unit/optical fibre cable can become trapped at the point of damage; and 2) there may be a reduction in airflow through the ducting or tube caused by a reduction in the cross-section thereof, which will prevent the optical fibre unit or optical fibre cable from being installed successfully.

It is known to detect internal damage to a tube in an optical fibre cable by blowing a short length, for example 150 mm, of optical fibre unit along the tube. The test piece usually has a rounded bead crimped to its front end to reduce the likelihood of its snagging against the wall of the tube. If the test piece blows through the tube successfully, it is known that the tube is in good condition for installation of an optical fibre unit. If the test piece does not emerge from the end of the tube, it is known that there is damage causing a blockage. However, this does not identify the location of the blockage. The location can be determined by installing an optical fibre unit until it reaches the blockage. The position of the blockage can then be determined by reference to the length indicator on the blowing head.

It is an object of the invention to provide methods and apparatus for determining the location of obstructions in ducting or tubing of a blown fibre installation, without the need to attempt to install the optical fibre unit or optical fibre cable.

SUMMARY OF THE INVENTION

The invention provides a method of determining the position of a blockage in a passage having a first end and a second end, said method comprising blowing a sealing device into said passage to form a seal adjacent said blockage, then blowing a gas into said passage from said first end, making at least one measurement concerning said gas blown into said passage from said first end and determining a distance D between said first end and said sealing device using said at least one measurement.

BRIEF DESCRIPTION OF THE DRAWINGS

In order that the invention may be well understood, embodiments thereof, which are given by way of example only, will now be described with reference to the drawings, in which.

DESCRIPTION OF THE EMBODIMENTS

Figure 1:
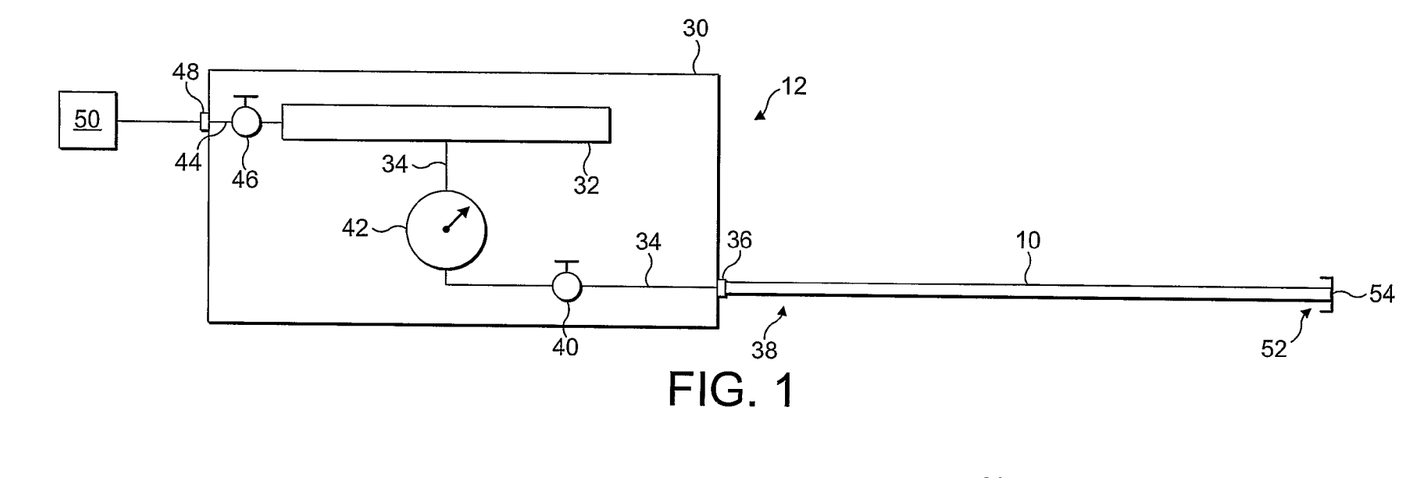
FIG. 1 is a schematic illustration of an optical fibre cable and an optical fibre cable length determining apparatus for determining the length of a tube in the cable.
Figure 2:
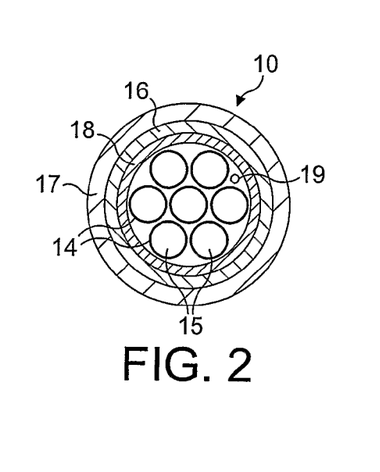
FIG. 2 is a schematic cross-section of an optical fibre cable for use in blown fibre installation.
Figure 3:
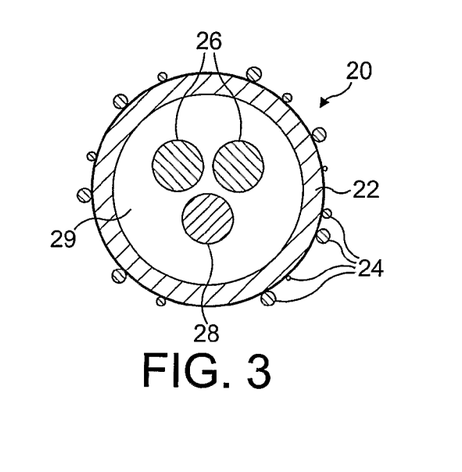
FIG. 3 is a schematic cross-section of an optical fibre unit suitable for installation in the optical fibre cable of FIG. 2.

Referring to FIGS. 1 to 3, an optical fibre cable 10 is shown connected to an optical fibre cable length determining apparatus 12 for determining the length of a tube or conduit 14 (FIG. 2) that extends along the length of the optical fibre cable. The tube(s) 14 is/are empty prior to the installation of an optical fibre unit.

As described in more detail below, the optical fibre length determining apparatus 12 is suitable to determine the location of a blockage or obstruction in the tube 14.

The optical fibre cable 10 may be of any suitable type that includes at least one tube 14 that defines a passage 15 along which optical fibre units may be installed by blowing. An example of a suitable cable construction is shown in FIG. 2. The cable 10 shown in FIG. 2 comprises seven tubes 14 encased in an MDPE inner sheath 16 and an HDPE outer sheath 17. An aluminium water barrier 18 may be provided between the tubes 14 and the inner sheath 16. A rip cord 19 may also be provided. The tubes 14 may, for example, be made of polyethylene with a carbon-loaded radially inner surface to increase conductivity, as disclosed in U.S. Pat. No. 4,952,021. Another example would be a polyethylene tube lined with a low friction silicon material. Examples of commercially available optical fibre cables that may be used are the MiniGlide™ and MicroGlide™ blown fibre systems supplied by Radius Plastics Limited and the MHT FibreFlow (trade name) range supplied by Emtelle International Limited.

There are many types of optical fibre units suitable for installation by blowing. These will be known to those skilled in the art and include enhanced performance fibre units (EPFU) such as the Sirocco® SM2F, SM4F and SM8F EPFUs made and sold by companies from the Pirelli group. A cross-section of an EPFU 20 from the Sirocco® SM2F range is shown in FIG. 3. The EPFU 20 comprises a resin sheath 22 covered with a surface modifier comprising glass beads 24 that enhance the blowability of the EPFU by reducing the coefficient of friction of the EPFU. The sheath 22 houses a number of optical fibres 26, in this case two, and a ripcord 28, all embedded in a matrix 29 of a material that is relatively soft compared with the sheath 22. EPFUs in the Sirocco® range have nominal outside diameters in the range 1.2 to 1.4 mm, have blowing distances in the range 500 to 1000 m and typically include two to eight optical fibres.

The optical fibre cable length determining apparatus 12 comprises a housing 30 to which is mounted a pressure reservoir in the form of a compressed air cylinder 32 of known volume $V_1$ for containing compressed air. The compressed air cylinder 32 is connected to outlet piping 34 that extends to a connector 36. The connector 36 may be of any type suitable for making a sealed connection to the upstream end 38 of a tube 14 in the cable 10. An isolation valve 40 and a pressure gauge 42 are fitted into the outlet piping 34 between the cylinder 32 and the connector 36.

An inlet pipe 44 is connected to the compressed air cylinder 32. An inlet valve 46 is provided in the inlet pipe 44, which at its upstream end has a connector 48 by which the pipe can be connected with means 50 for providing pressurised air to fill the compressed air cylinder 32. That means 50 could, for example, be an airline system in a building, a portable compressor or a large volume gas cylinder, whichever is convenient for a particular measuring task and environment. The valves 40, 46 may be any type of valve suitable for controlling the flow of a gaseous fluid. Similarly, the piping 34, 44 may be of any type suitable for conveying compressed air at the operating pressures of the system and the pressure gauge 42 may be of any type suitable for use with compressed air and capable of detecting pressure changes within operating range of the apparatus.

In use, the connector 36 is connected to the upstream, or first, end 38 of a tube 14 of the optical fibre cable 10 and the downstream, or second, end 52 of the optical fibre cable 10 is capped with an approved pressure retaining cap 54, such as the NC711-02 and NC712-02 end stops supplied by John Guest Ltd of West Drayton, Middlesex in the United Kingdom. These end stops are plastics end caps designed for use in the telecommunications market. Specifically, the end caps comprise a plastics body carrying one or more O-rings designed to fit on a particular diameter tube 14. The plastics body has a rotatable end portion and rotation of this end portion causes the O-ring to be clamped firmly onto the tube 14.

The inlet valve 46 is opened with the isolation valve 40 closed and the compressed air cylinder 32 is filled with compressed air to a predetermined pressure $P_1$ (for example 10 Bar-1000 Kn/m²). Once the required pressure is reached, the inlet valve 44 is closed and the isolation valve 40 is opened, thus releasing the compressed air into the tube 14. Once the pressure $P_2$ in the system downstream of the inlet valve 46 has stabilised, the pressure $P_2$ is determined from the pressure gauge 42.

The air in the system can be considered to be an ideal gas and since its temperature before and after release from the compressed air cylinder will for practical purposes be a constant, Boyle's law applies. Therefore PV=n where:

P=pressure

V=volume n=a constant

From this relationship it can be determined that $P_1V_1=P_2V_2$ where:

$P_1$=cylinder pressure $V_1$=cylinder volume $P_2$=pressure between inlet valve 46 and retaining cap 54 after release of compressed air from the cylinder 32

$V_2$=volume between inlet valve 46 and retaining cap 54

Since $$\frac{P_1V_1}{P_2} = V_2$$

it is possible to determine the volume $V_t$ of the tube 14 by subtracting the known volume of the cylinder $V_1$ from the volume $V_2$. It will be appreciated that this calculation does not take account of the volume (i) of the inlet pipe 44 between the inlet valve 46 and the compressed air cylinder 32, (ii) the piping 34 between the compressed air cylinder and the connector 36, (iii) the isolation valve 40 or (iv) the pressure gauge 42. However, in terms of the volume $V_t$ of the tube 14, which could, for example be 500 m to 1000 m, or more, long, these volumes are negligible and can be discounted. Obviously, it would be possible to determine these unknown volumes and add them to $V_1$ if this was desired in order to arrive at a more accurate result, but for practical purposes, this is not considered necessary.

Since the diameter of the passage 15, which is the inside diameter d of the tube 14, can readily be determined by measurement and the volume $V_t$ of the tube 14 has been determined, it is possible to determine the length $L_t$ of the tube, since $$V_t = \frac{\pi d^2}{4}L_t$$

and therefore $$\frac{4V_t}{\pi d^2} = L_t \text{ or } \frac{4(V_2 - V_1)}{\pi d^2} = L_t$$

Figure 4:
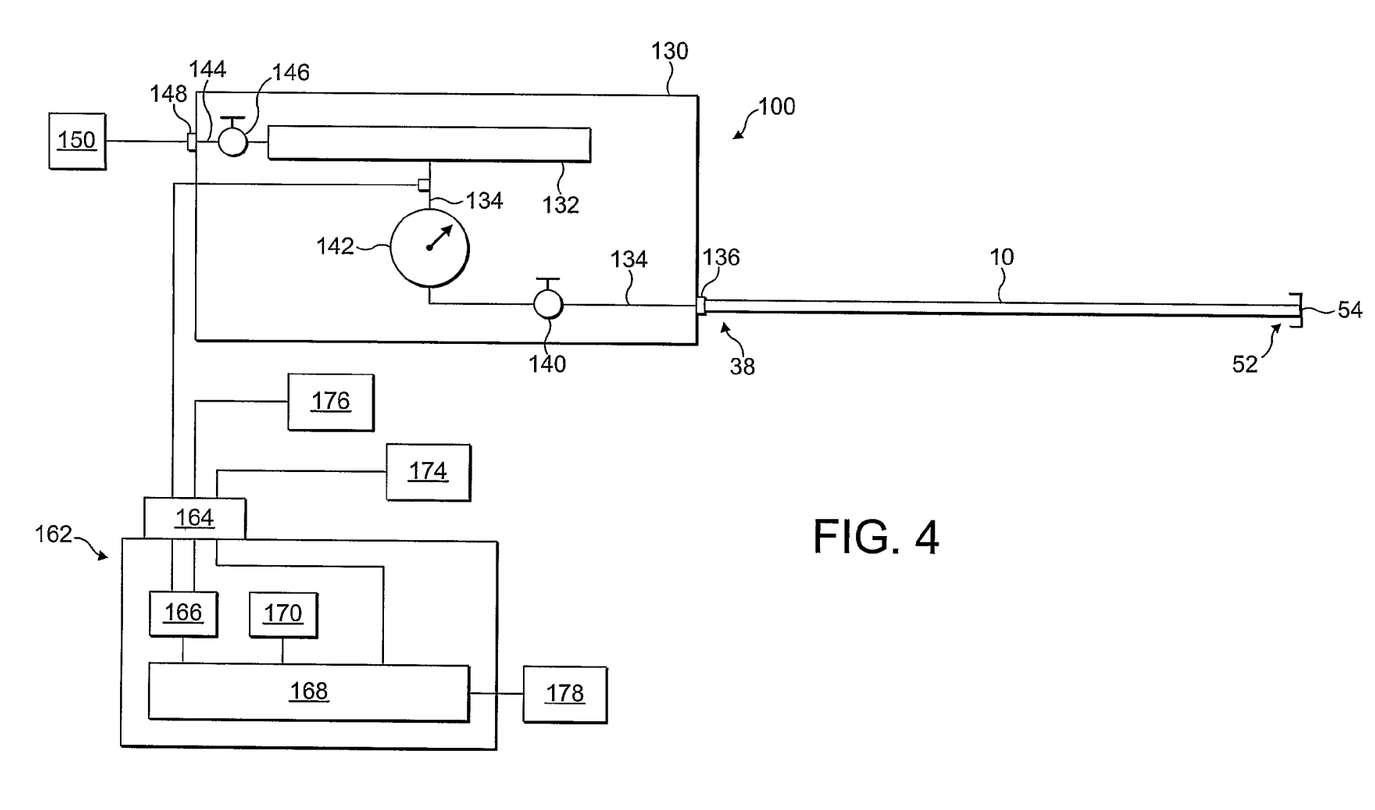
FIG. 4 is a schematic illustration of a modified version of the apparatus shown in FIG. 1.

It will be appreciated that knowing the pressures $P_1$ and $P_2$, the volume $V_1$ and the diameter d of the tube 14, the installer can readily carry out the calculations necessary to determine the tube length $L_t$. However, it may be desirable to provide the apparatus 12 with onboard computing means so that the length can be computed and the result displayed for the installer. For this purpose, a modified apparatus 100 as shown in FIG. 4 can be provided.

In the modified apparatus 100, components equivalent to those described in connection with the apparatus 12 are given the same reference numeral, but incremented by 100 and will not be described again in any detail.

The apparatus 100 includes a pressure transducer 160 which can be situated at any appropriate position at which it can sense the pressures $P_1$ and $P_2$. The pressure transducer 160 provides a signal indicative of the pressure sensed and communicates the signal to a computing module 162 via an input/output interface 164, which may include an analogue to digital (a/d) converter. The input/output interface 164 is connected to a random access memory (RAM) 166 in which signals from the pressure transducer 160 can be stored for access by a processor (CPU) 168. The computing module 162 also comprises a read only memory (ROM) 170 in which known parameters such as the volume $V_1$ of the compressed air cylinder 18 are stored. The CPU 168 outputs digital data to the input/output interface 164, which is connected to a display means, which may for example be an LCD 174. The computing module is also provided with an input device, such as a keypad 176, by means of which the installer may input data, such as the diameter of the tube 14. The keypad 176 is connected to the RAM 166 via the input/output interface 164 from where the data input by the user can be accessed by the CPU 168.

The computing module 162 may be powered by a battery unit 178 and the keypad 176 may include an on/off switch (not shown) so that the computing module 162 can be switched off to conserve battery power. A suitable converter (not shown) may be provided between the battery unit 178 and the components of the computing module 162 that require electrical power so that each receives electrical energy in the required form.

The ROM 170 will store suitable software for operating the computing module 162, including an algorithm for determining the length $L_t$ of the tube 14 from the data received in and stored by the RAM 166 and ROM 170. The algorithm would typically include steps that would produce on the LCD prompts for the installer to carry out each stage of the process (i.e. fill the cylinder 32, 132, open the isolation valve 40, 140, input the tube diameter d). More sophisticated systems may allow the installer to select the measurement units to be used.

It will be appreciated that the components of the computing module 162 have been described in brief and that other components may be included. However, such additional components and the implementation of a suitable algorithm will all be readily apparent to those skilled in the art and will not therefore be described in any detail.

It will be appreciated that the various components of the computing module 162 may be provided in or on the housing 130. Alternatively, a separate unit with a cable for establishing an electrical connection to the pressure transducer 160 may be provided. As a further alternative, a hand held unit comprising all of the features of the computing module 162, except the transducer 160 may be provided. In this case, the installer would merely have to input the pressures $P_1$ and $P_2$ read from the pressure gauge 42,142 and the diameter d of the tube 14 in order to have the tube length $L_t$ displayed on the LCD 174. Again, a suitable algorithm would be stored in the ROM 170 to control the unit, provide the installer with prompts for the input of necessary data and carry out the necessary calculations.

In the embodiments, only one compressed air cylinder 32, 132 is shown. However, two or more cylinders can be provided as desired. Two or more cylinders are provided in order to provide a sufficient volume for testing longer optical fibre cables. This avoids having to work at elevated gas pressures in order to provide sufficient gas in a smaller volume. By providing suitable connections and valving between multiple cylinders, a variable volume pressure reservoir is provided for testing cables of different lengths. Thus in one mode, the volume $V_1$ would be provided by one cylinder for measuring relatively shorter cables, while in a second mode, the volume $V_1$ would be provided by two or more cylinders for measuring the length of relatively longer cables.

It will be appreciated that the apparatus 12, 100 provide a means for quickly and easily determining the length of a tube 14 prior to installation of an optical fibre unit. Thus the installer can ensure that the length of optical cable unit available is sufficient for the purpose and set the parameters of the blowing process to ensure reliable installation of the optical fibre-unit. A further feature of the apparatus is that by observing the pressure gauge 42, 142 after the compressed air from the cylinder 32, 132 has been released, the integrity of the installation route can be determined. If the pressure $P_2$ does not stabilise, but continues to fall, this is an indication of an air leak. This could be the result of a faulty connection or a fault in the tube 14. If there is fault in the tube, this is likely to severely limit the distance the optical fibre unit can be blown and the installer may therefore choose to use another tube 14 if space is available, or may have to consider breaking into the cable along the installation route to install sections of optical fibre unit for splicing together.

The volume $V_1$ of the cylinder 32, 132 and the pressure $P_1$ may be selected as required for the applications for which the apparatus is to be used. It will be appreciated that the figure of 10 Bar mentioned above is purely by way of example and all that is necessary is to ensure there is sufficient mass of gas in the cylinders to produce a measurable change in pressure from $P_1$ to $P_2$ taking into account the resolution of the pressure gauge 42, 142 and/or the pressure transducer 162 and the desired accuracy of the measurement.

As mentioned above, the respective volumes of the piping, valves and pressure gauge are not taken into account in determining the length $L_t$ of the tube. For practical purposes the effect of these volumes on the result is irrelevant. It has been found in tests on a prototype apparatus 12 that the length $L_t$ can be calculated with an accuracy of 95%. An accuracy of 95% is considered to provide a value sufficiently representative of the actual length of the tube passage for practical purposes.

Figure 5:
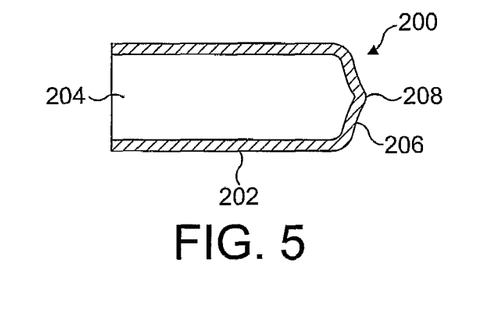
FIG. 5 is an axial cross-section through a sealing device.
Figure 6:
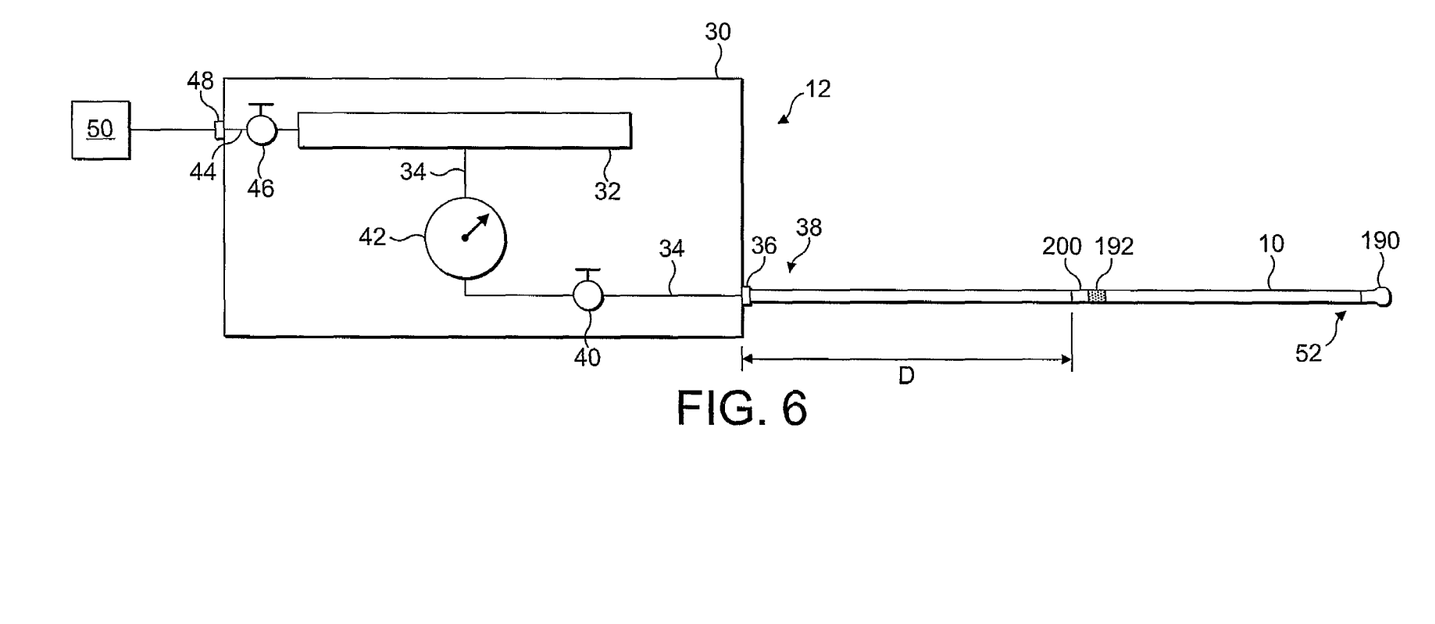
FIG. 6 is a modified version of FIG. 1 illustrating use of the optical fibre length determining apparatus for determining the position of an obstruction in a tube of the optical fibre cable.

In accordance with an aspect of the invention, the optical fibre cable length determining apparatus 12, 100 can be used to determine the location of blockages in the tubes 14 of an optical fibre cable 10. This aspect will now be described with particular reference to FIGS. 5 and 6. FIG. 6 corresponds essentially to FIG. 1, except that it shows features relating to a blockage 192 in a tube 14.

Either prior to determining the length of the optical fibre cable 10, or afterwards, a tube 14 may be tested to see whether there are any blockages or obstructions that will prevent successful installation of an optical fibre unit. First, a test piece (not shown) is blown along the tube 14 to be tested by a known blowing head, such as Pirelli's Sirocco® blowing head. The test piece is preferably a short length, for example 150 mm of the optical fibre unit 12 that is to be installed in the tube 14. Preferably, a radiussed bead is crimped onto the leading end of the test piece. For optical fibre units having an external diameter in the range of 1.0 to 1.3 mm, the bead might have a diameter of around 2.4 mm. The purpose of the bead is to reduce the likelihood of the test piece snagging against the passage 15 wall.

Preferably, an end stop 190 (FIG. 6) is fitted into the downstream end 52 of the tube 14 that is to be tested prior to blowing the test piece along the tube. The end stop 190 is different to the pressure retaining cap 54 shown in FIG. 1 in that it is permeable to gas. The purpose of the end stop 190 is to catch the test piece. The end stop may be a ceramic end stop as supplied by Factair Ltd of Ipswich in the United Kingdom.

The test piece is blown into the tube 14 using compressed gas supplied by either of the blowing head or the length determining apparatus. A preferred blowing pressure is around 10 Bar. If there is no blockage or obstruction in the tube 14, the test piece will arrive at the end stop 190. The installer then knows whether the tube is clear for installation. If it is, installation can proceed.

If the test piece is prevented from reaching the end stop 190 by some form of obstruction 192, the apparatus 12, 100 is then used to determine the position of the obstruction in the tube. First, a sealing device 200, such as that device shown in FIG. 5, is inserted into the upstream end 38 of the tube 14. The blowing head is then connected to the upstream end 38 of the tube to blow the sealing device 200 along the tube until it reaches the obstruction 192. Typically, a pressure of around 10 Bar is used to blow the sealing device 200 along the tube. Preferably, the blowing pressure is maintained for approximately 10 minutes. The sealing device 200 will become trapped behind the obstruction 192 and the test piece (not shown), and should seal the passage 15 at the location of the obstruction. The purpose of maintaining the pressure for 10 minutes is to ensure that the sealing device 200 is in place just behind the obstruction 192.

A presently preferred form of the sealing device 200 is shown in FIG. 5. The sealing device 200 comprises a hollow cylindrical member 202 having an annular wall defining a circular axially extending recess 204. The recess 204 is closed at one end by a curved end wall 206 with an axially central pip 208. The cylindrical member 202 is preferably an integral plastics moulding. A presently preferred form is made of UV stabilised PVC plastisol and has the following properties:

| | |
|---|---|
| Specific Gravity | 1.15-1.20 at 20° C. |
| Hardness | 70-75 Shore A |
| Tensile Strength | 15 MN/m² |
| Coefficient of Friction | 1.2-1.5 (static) |
| | 1.3-1.8 (sliding) |

For a tube 14 with a 3.5 mm internal diameter, the preferred dimensions of the cylindrical member 202 are: length 5-8 mm and outside diameter 3.5-3.6 mm.

It will be understood that many other forms of sealing device could be used and that the dimensions and properties of the sealing device can be selected as desired for a particular purpose.

With the sealing device 200 in place, the gas supply is turned off and the passage 15 behind the sealing device is vented to atmosphere. At present, it is preferred that the venting takes place for approximately 15 minutes.

Next, the optical fibre length determining apparatus 12, 100 is connected to the upstream end 38 of the tube 14 in the same way as if the apparatus were being used to determine the length of the cable 10. However, it is not necessary to fit the end cap 54. This is because the sealing device 200 takes the place of the end cap. The apparatus 12, 100 is then operated in the same way as if it were being used to determine the length of the cable 10. It will be understood that the methodology for determining the distance D from the upstream end 38 of the cable to the sealing device 200 is exactly the same as when determining the length of the cable, except that in this case, the length determined is not the length $L_t$ of the cable, but the distance D from the upstream end 38 to the sealing device 200.

Thus, the relationship $$\frac{4V_t}{\pi d^2} = D \text{ or } \frac{4(V_2 - V_1)}{\pi d^2} = D$$

applies.

In the same way as when determining the length $L_t$ of a tube 14, it is not significant whether the respective volumes of the piping, valves and pressure gauge are taken into account, those volumes are not likely to be significant in determining the distance D to a blockage 192.

Figure 7:
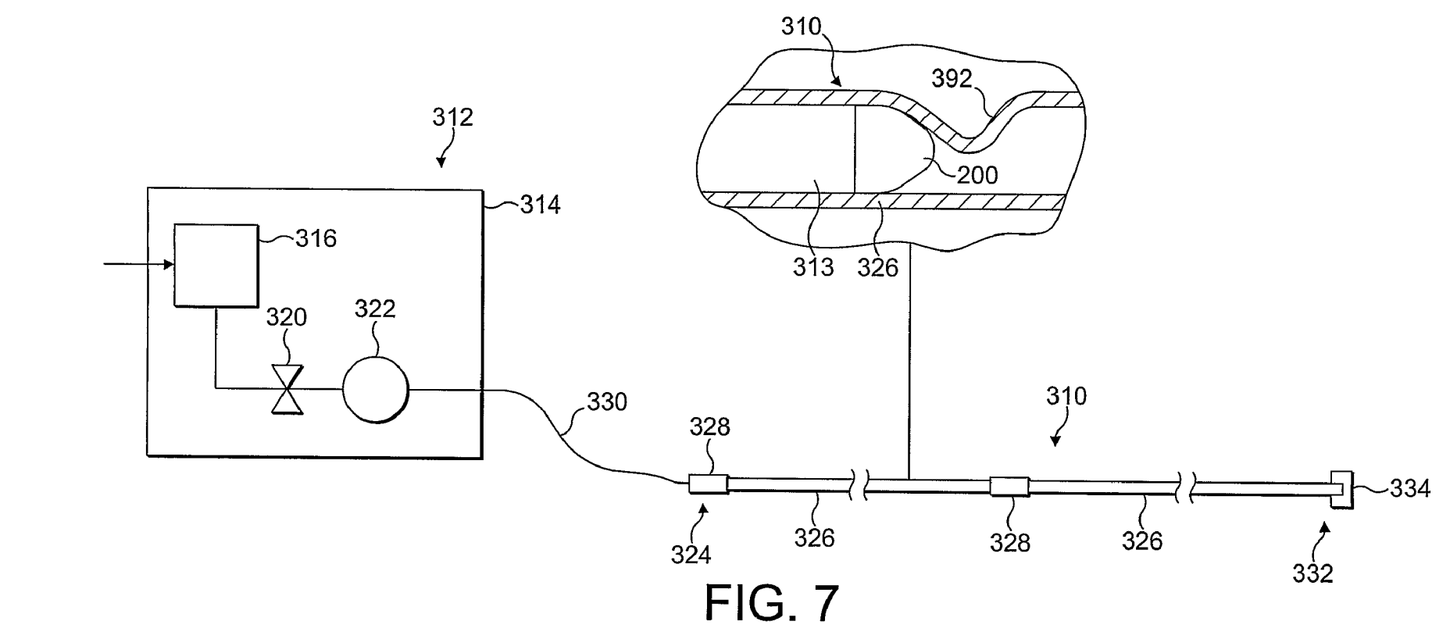
FIG. 7 is a schematic illustration of an optical fibre ducting system and an optical fibre ducting system length determining apparatus for determining the length of the ducting system and includes an enlargement showing a blockage in the ducting system.

FIG. 7 illustrates an apparatus 312 for determining the length of a ducting system 310. The ducting system 310 is intended for blown installation of optical fibre cables. Ducting for blown installation of optical fibre cables can be up to 5 km long and typical internal diameters for such ducting are 20, 25, 33 and 40 mm. The optical fibre cables that are blown along such ducts will typically have a diameter of 13 to 25 mm. Although the optical fibre cable length determining apparatus 12, 100 may be used to determine the length of such ducting, its use is limited by the need to provide a reservoir volume VI sufficient to create a significant pressure change in the duct whose length is to be measured. The apparatus 312 for determining the length of a ducting system, although not limited to such use and capable of being used to determine the length of a tube 14 in an optical fibre cable, is intended to be able to measure the length of ducting having larger volumes than are typical of tubes 14 in optical fibre cables.

Referring to FIG. 7, an optical fibre ducting system 310 is shown connected to an optical fibre ducting system length determining apparatus 312. The ducting system 310 is empty prior to the installation of an optical fibre cable. The ducting system 310 defines a passage 313 along which optical fibre cables can be installed by blowing.

The optical fibre ducting system length determining apparatus 312 comprises a housing, or support, 314 for a pressurised gas supply device 316. The device 316 includes a compressor provided with pressure and flow gauges. The device 316 is configured to receive air at atmospheric pressure and provide pressurised air at a predetermined flow rate and pressure. A suitable commercially available device is produced, for example, by Factair Ltd of Ipswich in the United Kingdom.

On its outlet side, the device 316 is connected to the inlet side of a flow valve 320. On its outlet side, the flow valve 320 is connected to a pressure gauge 322 and further downstream, to an upstream end 324 of the ducting system 310.

The ducting system 310 comprises a plurality of lengths of ducting 326 that are interconnected by air-tight connectors 328. In the drawing, two lengths of ducting 326 are shown connected by a single air-tight connector 328. However, it will be understood that the ducting system 310 may comprise three or more lengths of ducting interconnected by an appropriate number of air-tight connectors, or a single length of ducting. A suitable air-tight connector 328 is fitted to the end 324 of the ducting system to permit connection with the length determining apparatus 312 via a tube 330. Preferably, the arrangement is such that the tube 330 is connectable to an airtight connector 328 of the type used to connect the lengths of ducting. However, it will be understood that a specially designed, or otherwise different connector arrangement could be provided for connecting the tube 330 to the end 324 of the ducting system 310.

The ducting system may comprise ducting 326 and connectors 328 as supplied by Radius Plastics Ltd of Newry, Northern Ireland, or Emtelle UK Limited of Hawick, Scotland. Suitable connectors are also provided by Plasson Ltd of Israel.

The ducting system 310 is installed without optical fibre cabling and may be installed and located in any conventional and convenient way. The optical fibre cabling is installed later by blowing the optical fibre cable along the ducting. Prior to installation of the optical fibre cabling, the installer can determine the length of the ducting system 310 using the length determining apparatus 312.

To determine the length of the ducting system 310, the length determining apparatus 312 is coupled to the ducting system by means of the tube 330 and air-tight connector 328. The other end 332 of the ducting system 310 is capped using a pressure-retaining cap 334.

With the ducting system 310 connected to the length determining apparatus 312 and the end 332 capped, the compressor of the gas supply device 316 is started. Once the compressor has settled in a required operating state, the flow valve 320 is opened to permit compressed air from the compressor to flow into the ducting system 310. The air flows into the ducting system 310 at a constant pressure $P_1$ and flow rate $V_f$ determined by the flow device 316. The flow valve 320 is a simple on/off valve. It does not have any pressure/flow regulation function and is sufficiently large as to not impede the flow of air from the device 316.

When the flow valve 320 is opened, the operator commences timing the filling of the ducting system 310 while observing the pressure gauge 322. When the gauge 322 indicates that a predetermined pressure $P_2$ has been reached, the flow valve 320 is closed and the timing process is stopped. With the flow valve 320 closed, the pressure gauge 322 can be monitored to determine whether the ducting system 310 is airtight; a drop in the pressure registered by the pressure gauge 322 would indicate a leak in the ducting system.

The operator uses the filling time $t_f$ to determine the length of the ducting system 310. Knowing the flow rate $V_f$ of compressed air supplied by the device 316 and the time $t_f$ taken to reach the predetermined pressure $P_2$ at which the timing process is stopped, the operator is able to determine the volume $V_1$ of air that has been pumped into the ducting system 310 ($V_1 = t_f V_f$). The diameter $d_d$ of the ducting 326 is known, or can be measured, and knowing this and the volume $V_1$ it is possible to determine the length $L_d$ of the ducting system.

For the purpose of determining the length $L_d$ of the ducting system, the air in the system can be considered to behave as an ideal gas and since its temperature will for practical purposes be a constant, Boyle's law applies. Therefore PV=n where:

P=pressure

V=volume n=a constant

From this relationship it can be determined that $P_1 V_1 = P_2 V_2$ where:

$P_1$=pressure at which the air is supplied from the gas supply device 316

$V_1$=the volume of air pumped into the ducting system $P_2$=the predetermined pressure at which the flow valve 320 is closed $V_2$=the volume between flow valve 320 and retaining cap 334 and $$V_2 = \frac{P_1 V_1}{P_2}.$$

The volume $V_2$ will approximate to the volume $V_d$ of the ducting system 310. It will be appreciated that this does not take account of the volume of the piping between the flow valve 320 and the connector 328 and, hence, $V_d \cong V_2$. However, in terms of the volume $V_d$ of the ducting system 310, which could, for example be 5 km long, this volume is negligible and can be discounted. Obviously, it would be possible to determine this unknown so that it could be taken into account in order to arrive at a more accurate result, but for practical purposes, this is not usually considered necessary.

Since the inside diameter d of the ducting system can readily be determined by measurement and the volume $V_d$ of the ducting system has been determined, it is possible to determine the length $L_d$ of the ducting system, since $$V_d = \frac{\pi d^2}{4} L_d$$

and therefore $$\frac{4 V_d}{\pi d^2} = L_d$$

It will be appreciated that knowing the pressures $P_1$ and $P_2$, the volume $V_1$ and the diameter d of the ducting system 310, the installer can readily carry out the calculations necessary to determine the length $L_d$ of the ducting system. As an alternative to having the installer calculate the length $L_d$, graphs for different diameters of ducting with time plotted against length for a specified pressure $P_2$ and flow rate $V_f$ could be supplied so that the installer would simply read the length off of the graph with reference to the time. As yet another alternative, lookup tables could be provided allowing the installer to determine the ducting system length from the time $t_f$, flow rate $V_f$, pressure $P_2$ and ducting system diameter d.

Figure 8:
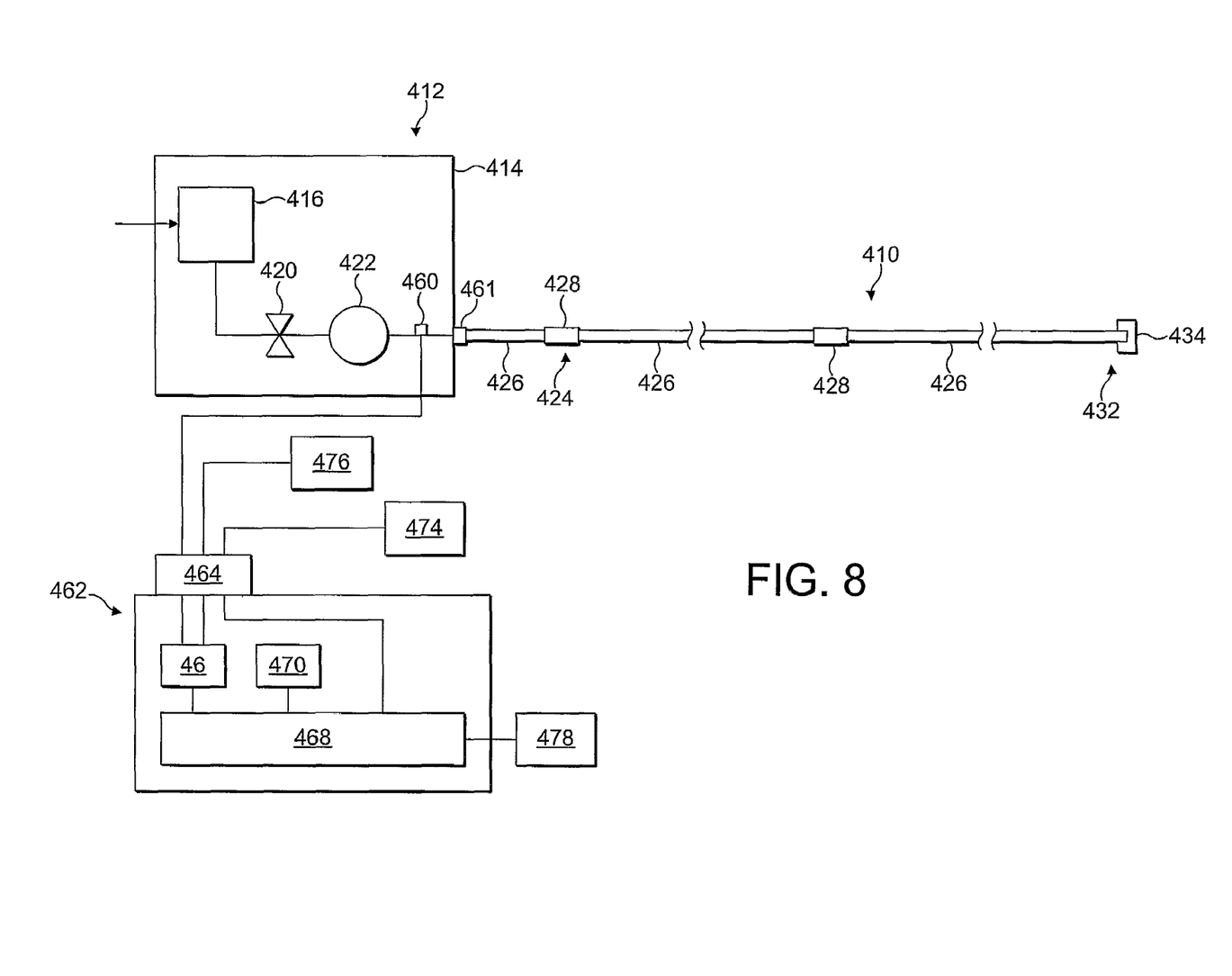
FIG. 8 is a schematic illustration of a modified version of the apparatus of FIG. 7.

In a preferred apparatus 412 for determining the length of a ducting system, which is to be described below with reference to FIG. 8, the timing process and determination of the length of the ducting system is carried out automatically by the length determining apparatus, which is provided with onboard computing means.

In describing the preferred apparatus 412 shown in FIG. 8, components described in connection with the apparatus 312 are given the same reference numeral incremented by 100 and will not be described again in any detail.

The apparatus 412 includes a pressure transducer 460, which can be located at any appropriate position in which it can sense the pressure of the gas in the ducting system 410. This can be anywhere downstream of the gas supply device 416. Preferably, the pressure transducer is mounted in the housing 414, downstream of the flow valve 420. As explained in more detail below, if the pressure transducer senses the ducting system pressure from a location downstream of the flow valve 420 it can be used in determining the ducting system length and monitoring the pressure in the ducting system to check for gas leaks.

In apparatus 412, a connector 461 mounted on the housing 414 connects with the upstream end 424 of the ducting system 410 by means of a short length of ducting 426.

The pressure transducer 460 is shown positioned downstream of the pressure gauge 422. It will be understood that in this embodiment, the pressure gauge 422 could be omitted. However, it may be useful for an operator to be able to view the pressure and so the pressure gauge may be retained. Alternatively, a display (not shown), could be provided to show the pressure sensed by the pressure transducer 460.

The pressure transducer 460 provides a signal indicative of the pressure sensed and communicates the signal to a computing module 462 via an input/output interface 464, which may include an analogue to digital (a/d) converter. The input/output interface 464 is connected to a random access memory (RAM) 466 in which signals from the pressure transducer 460 can be stored for access by a processor (CPU) 468. The computing module also has a read only memory (ROM) 470 in which an operating program and data are stored. The CPU 468 outputs digital data to the input/output interface 464, which is connected to a display means 474, which could for example be an LCD. The computing module is also provided with an input device, such as a keypad 476, by means of which an operator may input data such as the diameter of the ducting 426. The keypad 476 is connected to the RAM 466 via the input/output interface 464. Data input by the operator and held in the RAM 466 can be accessed by the CPU.

The computing module 462 may be powered by a battery unit 478, which may be rechargeable. A suitable converting unit may be provided between the battery unit 478 and the components of the computing module that require electrical power, so that each receives electrical energy in the required form. Alternatively, the computing module 462 can be designed to be powered by an ac mains electrical supply, such as the 240 V ac supply available in the United Kingdom.

The ROM 470 will store suitable software for operating the computing module 462, including an algorithm for determining the length $L_d$ of the ducting system 410 from the data received in and stored by the RAM 466 and data held in the ROM 470. More sophisticated systems may allow the installer to select the measurement units to be used.

For the purpose of timing the supply of air to the ducting system 410, the computing module 462 may be provided with a timer, not shown. Alternatively, use may be made of the CPU's internal clock. The timing process may be initiated by providing a suitable key, or switch, so that the operator can start timing the supply process when the flow valve 420 is opened. Alternatively, the timing process could be initiated automatically, for example, by a signal from the flow valve 420 indicating that it has been opened. The flow valve 420 could be provided with a microswitch or the like to provide an indication that the valve has been opened.

While the timing process is in operation, pulses from the timer are collected in a register to permit the time to be determined. As with the initiation of the timing process, termination can be manual. Alternatively, the termination of the timing process could be ordered by the CPU when the pressure signal from the pressure transducer 460 indicates that the predetermined pressure has been reached.

The ROM may contain data, in the form of look-up tables that will allow the length of the ducting system to be determined from the time measurement. The data could mirror the graphical representations described above. Alternatively, the flow rate permitted by the flow device 416 and the predetermined pressure to which the ducting system is fitted would also be stored in the ROM. In this case, the CPU would operate on the basis of a suitable algorithm to determine the ducting system length $L_d$ by reference to stored data and the time measurement using the relationships $$V_1 = t_f.V_f,\ V_2 = \frac{P_1 V_1}{P_2} = V_d \text{ and } \frac{4V_d}{\pi d^2} = L_d$$

The CPU 468 would output the determined length $L_d$ to the LCD 474 for display to the operator.

The computing module 462 can be designed to monitor the pressure in the ducting system 410 to determine whether there is gas leakage. A leak will be indicated if the pressure falls below the level $P_2$. If leakage is detected, this can be notified to the installer visually, via the display 474 or a light source, for example an LED, and/or audibly.

It will be appreciated that the components and circuitry of the computing module 462 have been described in brief and that other components may be included. However, such additional components and the implementation of a suitable algorithm will all be readily apparent to those skilled in the art and will not therefore be described in any detail.

It should be noted that care needs to be taken in selecting the pressure $P_2$ that is the predetermined pressure to which the ducting system is filled. It is important that the gas flow rate and the supply pressure $P_1$ are substantially constant. When the gas is introduced into the ducting system, the flow rate set by the flow device 416 will be constant until the pressure in the ducting system gets to a certain level. Once that level is reached, the air flow will start to reduce and so the predetermined pressure $P_2$ must be below that level.

For more accurate length determination, it may be desirable to take into account the coefficient of friction the internal wall of the passage into which the optical fibre unit, or cable, is to be installed. This is because the frictional properties of the wall may affect gas flow into the passage and, therefore, the time taken to fill the passage to the predetermined pressure $P_2$.

It is envisaged that an apparatus for determining a length at least representative of the length of a passage or ducting into which an optical fibre unit or cable is to be installed by blowing may comprise a unit comprising a constant pressure and flow device which receives a supply of pressurised gas and provides an output at a substantially constant pressure and flow rate. The unit would preferably comprise a computing module that can determine the length $L_d$ of such a passage or ducting based on signals indicative of the time period $t_f$ in which gas is supplied from the flow device to such a passage or ducting. Preferably, the flow device would include a part defining an orifice, or aperture, of predetermined diameter to ensure a constant flow rate. The unit could further comprise pressure gauges and/or on/off valves as described in connection with FIGS. 7 and 8. It is envisaged that the unit would be provided with a suitable inlet device permitting connection to a pressurised gas supply, such as a compressor.

Referring particularly to the enlarged portion of FIG. 7, in the same way as the apparatus 12, 100 for determining the length of an optical fibre cable, the optical fibre ducting system length determining apparatus 312, 412 can be used to determine the position of a blockage 392 in the ducting. As described previously, the preferred first step is to blow a test piece through the ducting to discover whether there is a blockage. If the test piece emerges from the end of the ducting it can be assumed that there are no blockages in the pipe and installation of the optical fibre cable or unit can proceed. If the test piece does not emerge, the presence of a blockage is determined and the optical fibre ducting system length determining apparatus 312, 412 is used to determine the position of the blockage. In the same way as previously described, a sealing device 200 is blown along the ducting to form a seal behind the blockage. It is expected that in this case, the duration of the gas supply and venting procedures would take longer in view of the larger volumes involved.

Once the sealing device 200 is in place behind the blockage 392 and the passage 313 between the sealing device and the end 324 of the duct has been suitably vented, the apparatus 312, 412 is connected to the end 324 and the abovedescribed routine for determining the length of the ducting system is performed in the same way. The relationship $$V_d = \frac{\pi d^2}{4} L_d$$

applies with

Vd=the volume of the passage 313 between the flow valve and the sealing device 200, and Ld=D=the distance between the end 324 and the sealing device 200.

In each of the described procedures for determining the position of a blockage, a test piece is first blown down the tube/duct to determine the presence of a blockage. This is desirable, although not essential. Instead, the sealing device can serve the dual function of test piece and seal. It will be understood that if the sealing deice is blown along the tube/duct and comes out at the end, that indicates there is no blockage. However, the presently preferred form of sealing device is relatively soft and can deform to a significant extent and might squeeze past a blockage. The presence of a test piece just behind the blockage 192, 392 will prevent the sealing device 200 from squeezing past the blockage. However, it will be understood that other forms of sealing device can readily be produced that can serve the dual function of test piece and seal.

It will be appreciated that the apparatus 12, 100, 312, 412 provides the possibility of determining the length of a tube or ducting into which an optical fibre unit or optical fibre cable is to be installed by blowing. Also, by a related procedure, where a blockage is found to be present, the location of the blockage can be determined by making identical methodology; the difference is that instead of determining the length between the two ends of the tube or duct, the length that is determined is the length between an end of the tube or duct and the blockage. Thus, there is the advantage of utilising the same apparatus and methodology to provide the solution to two related problems. This results in efficiency in terms of use of apparatus and operator training.

Although in principle, any suitable gas could be used in implementing the abovedescribed methods, the preferred gas is compressed air.

Although the present invention has been described with reference to the installation into ducting and tubing, it is understood that the method and apparatus of the present invention may be used in connection with any type of passage suitable for blown installation of an optical fibre cable or an optical fibre unit, such as, for example, a passage defined internally by a hollow cable.

The invention claimed is:

1. A method of determining the position of a blockage (192,392) in a passage (15,313) having a first end and a second end, said method comprising blowing a sealing device (200) into said passage to form a seal adjacent said blockage (192,392), then blowing a gas into said passage from said first end, making at least one measurement concerning said gas blown into said passage from said first end and determining a distance D between said first end and said sealing device using said at least one measurement.

2. A method as claimed in claim 1, wherein said sealing device (200) comprises a plastics sealing element.

3. A method as claimed in claim 1 or 2, further comprising venting said passage to atmosphere at said first end subsequent to blowing said sealing device into said passage such that between said first end and said sealing device, the pressure in said passage is atmospheric pressure.

4. A method as claimed in claim 1, 2 or 3, wherein said ducting is for installation of an optical fibre cable or optical fibre unit and further comprising blowing a test piece of said optical fibre cable or optical fibre unit into said passage to determine the presence of a blockage, prior to said step of blowing a sealing device into said passage.

5. A method as claimed in claim 4, wherein said test piece has a radiussed nosepiece fitted to a leading end thereof.

6. A method as claimed in claim 4 or 5, further comprising fitting a gas permeable end stop to the one of said first and second ends of the passage opposite to the one of said first and second ends at which said test piece is to be blown into the duct.

7. A method as claimed in any one of the preceding claims, further comprising providing a first volume $V_1$ containing a gas at a first pressure $P_1$, wherein said step of blowing a gas into said passage from said first end comprises releasing said gas into a second volume $V_2$ that comprises said passage between said first end and said sealing device, said step of making at least one measurement comprises measuring a second gas pressure $P_2$ which is the pressure in said second volume $V_2$ after release of said gas from said first volume $V_1$, said second volume $V_2$ is determined by reference to said first pressure $P_1$, second pressure $P_2$ and said first volume $V_1$ and said distance D is determined by reference to said second volume $V_2$.

8. A method as claimed in claim 7, wherein said second volume comprises said passage between said first end and said sealing device and said first volume $V_1$.

9. A method as claimed in claim 8, wherein said second volume is determined from the relationship $$\frac{P_1 V_1}{P_2} = V_2.$$

10. A method as claimed in claim 7, 8 or 9, wherein said distance D is determined from the relationship $$D = \frac{4(V_2 - V_1)}{\pi d^2}$$

where d is a diameter of said passage.

11. A method as claimed in claim 7 to 10, wherein said first volume $V_1$ comprises a volume $V_p$ defined by a pressure reservoir.

12. A method as claimed in claim 11, wherein said first volume $V_1$ is equal to said volume $V_p$ of said pressure reservoir.

13. A method as claimed in any one of claims 7 to 12, wherein said second volume $V_2$ and/or said distance D is/are determined by a computing module.

14. A method as claimed in any one of claims 1 to 6, wherein said step of blowing a gas into said passage from said first end comprises flowing a pressurised gas into said passage at a substantially constant pressure $P_1$ and substantially constant flowrate $V_f$, said step of making at least one measurement comprises determining the time $t_f$ taken to provide a predetermined gas pressure $P_2$ within said passage and said distance D is determined by reference to said time $t_f$.

15. A method as claimed in claim 14, further comprising determining a volume $V_d$ at least approximating to a volume defined by said passage between said first end and said sealing device by reference to said flowrate $V_f$ and said time $t_f$.

16. A method as claimed in claim 15, further comprising determining a volume $V_1$ of said gas flowed into said passage from said first end by multiplying said flow rate $V_f$ by said time period $t_f$ and determining said volume $V_d$ from the relationship $$\frac{P_1 V_1}{P_2} = V_d.$$

17. A method as claimed in claim 16, wherein said distance (D) is determined from the relationship $$D = \frac{4(V_d)}{\pi d^2}$$

where d is a diameter of said passage.

18. A method as claimed in claim 15, 16 or 17, wherein said volume $V_d$ is determined by a computing module.

19. A method as claimed in claim 14, comprising determining said distance D by reference to said time period $t_f$ by referring to a plot of length against time for a specified passage diameter and said predetermined pressure $P_2$.

20. A method as claimed in any one of claims 14 to 19, wherein said distance D is determined by a computing module.

21. A method of determining the position of a blockage (192) in a passage (15) having a first end and a second end, the method comprising:
   providing sealing adjacent said blockage by blowing a sealing device (200) along said passage;
   connecting a pressure reservoir (32, 132) having a known volume $V_1$ with the first end (38) of the passage;
   releasing a gas at a known pressure Pi from said pressure reservoir (32, 132) into said passage;
   determining a pressure $P_2$ of the gas that is in a portion of said passage (15) between said first end and said sealing after said release of gas;
   determining the volume $V_2$ of said portion of said passage by reference to said known volume $V_1$, known pressure $P_1$ and determined pressure $P_2$; and
   determining a length at least representative of a distance D between said first end and said sealing by reference to said determined volume $V_2$ and a diameter of said passage.

22. A method of determining the position of a blockage (392) in a passage (313) having a first end and a second end, the method comprising:
   providing sealing (200) adjacent said blockage by blowing a sealing device (200) along the passage;
   connecting a compressor with said first end of the passage;
   supplying a gas at a substantially constant pressure $P_1$ and substantially constant flowrate $V_f$ from said compressor into said passage until a predetermined pressure $P_2$ exists in said passage between said first end and said sealing;
   determining the time period $t_f$ during which said gas was supplied into said passage;
   determining a volume $V_d$ indicative of a volume defined by said passage between said first end and said sealing by determining a pumped gas volume $V_1$ by multiplying said flowrate $V_f$ by said time period $t_f$ and the relationship $$\frac{P_1 V_1}{P_2} = V_d;$$

and
   determining a distance D at least representative of the distance between said first end and said sealing by reference to said volume $V_d$ and a diameter of said passage.

* * * * *